(12) United States Patent
Sano et al.

(10) Patent No.: US 6,984,905 B2
(45) Date of Patent: Jan. 10, 2006

(54) CASE AND ELECTRIC MOTOR HAVING AN ENGAGING OPENING AND DEFORMABLE BAND AND FOR PRODUCING THE ELECTRIC MOTOR

(75) Inventors: Narihito Sano, Tokyo (JP); Setsuya Uchino, Tokyo (JP); Shigenori Ohira, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 104 days.

(21) Appl. No.: 10/651,101

(22) Filed: Aug. 29, 2003

(65) Prior Publication Data

US 2004/0169428 A1 Sep. 2, 2004

(30) Foreign Application Priority Data

Sep. 17, 2002 (JP) .............................. 2002-269411

(51) Int. Cl.
*H02K 5/04* (2006.01)
*H02K 23/04* (2006.01)
*H02K 5/167* (2006.01)
*H02K 1/12* (2006.01)

(52) U.S. Cl. ............................. 310/89; 29/596; 29/505
(58) Field of Classification Search .................. 310/89; 29/505, 596, 516, 521; 220/682; 285/382
See application file for complete search history.

(56) References Cited

U.S. PATENT DOCUMENTS

| 3,234,414 | A | 2/1966 | Konijnenberg et al. ....... 310/47 |
|---|---|---|---|
| 4,335,323 | A | 6/1982 | Kebbon et al. ........... 310/40 R |
| 4,548,334 | A | 10/1985 | Huber et al. ................. 220/293 |
| 5,255,938 | A * | 10/1993 | Brede et al. ................. 280/736 |
| 6,191,516 | B1 * | 2/2001 | Froehlich et al. ...... 310/156.08 |
| 6,359,363 | B1 | 3/2002 | Foerstera et al. ........... 310/239 |
| 2004/0169428 | A1 * | 9/2004 | Sano et al. .................... 310/89 |

FOREIGN PATENT DOCUMENTS

| JP | 4-190646 A | 7/1992 |
|---|---|---|
| JP | 2793653 B2 | 6/1998 |

OTHER PUBLICATIONS

Patent Abstracts of Japan, vol. 015, No. 029, Jan. 23, 1991, JP 02-273046, Nov. 7, 1990.
Patent Abstracts of Japan, vol. 009, No. 065, Mar. 26, 1985, JP 59-201644, Nov. 15, 1984.
Patent Abstracts of Japan, vol. 015, No. 284, Jul. 18, 1991, JP 03-098434, Apr. 24, 1991.
Patent Abstracts of Japan, vol. 018, No. 635, Dec. 5, 1994, JP 06-245452, Sep. 2, 1994.

* cited by examiner

*Primary Examiner*—Karl Tamai
(74) *Attorney, Agent, or Firm*—Foley & Lardner, LLP

(57) ABSTRACT

An electric motor comprises a yoke in which permanent magnets are held, the yoke including a cylindrical yoke body having a bottom and an auxiliary yoke in which the yoke body is fitted, at least one engaging opening provided in one of said yoke body and auxiliary yoke and a deformable band provided in the other of said yoke body and auxiliary yoke. The deformable band is fitted in the engaging opening in a state that the yoke body and auxiliary yoke are fitted.

7 Claims, 18 Drawing Sheets

CASE AND ELECTRIC MOTOR HAVING AN ENGAGING OPENING AND DEFORMABLE BAND AND FOR PRODUCING THE ELECTRIC MOTOR

BACKGROUND OF THE INVENTION

1. Field of the Invention

The present invention relates to a case and an electric motor which is used to rotate a blower fan in an air conditioner for an automobile for carrying out cooling and heating in a passenger room of the automobile, for example, and a method for producing the electric motor.

2. Description of the Prior Art

In general, there is known a case having an outer cylindrical member and an inner cylindrical member fitted in the outer cylindrical member.

A lock means is required to lock the inner and outer cylindrical members. Conventionally, the lock means is complicate in structure and an operation for locking is not easy.

On the other hand, there is known an electric motor 1 as shown in FIG. 17 (see, for example, Japanese Patent Laid-Open No. 4-190646, pages 1 to 2, FIG. 2).

The electric motor 1 includes permanent magnets 2 for generating a magnetic flux and a cylindrical yoke 3 or a case on whose inner peripheral wall the permanent magnets 2 is held.

The yoke 3 has an inner cylindrical member or a cylindrical yoke body 4 having a bottom and an outer cylindrical member or an auxiliary yoke 5 fitted in an inner peripheral wall of the yoke body 4.

The auxiliary yoke 5 is mainly formed by a pressed-processing to have a thin wall thickness and is used to conduct an attenuation of a magnetic flux leaked from the yoke body 4.

The auxiliary yoke 5 has also at an outer peripheral wall thereof a slit 5c extending from one end, an upper end 5a to the other end, a lower end 5b to enlarge peripherally the auxiliary yoke 5, as shown in FIG. 18.

The auxiliary yoke 5 is enlarged peripherally by provision of the slit 5c and fitted on the yoke body 4 to surround it. In other words, the yoke body 4 is inserted into the auxiliary yoke 5.

In addition, the auxiliary yoke 5 is provided with slits 5d which are opened at the upper and lower ends 5a and 5b of the auxiliary yoke 5, respectively to eliminate a leaked magnetic flux in the electric motor 1.

There is also known an electric motor that a cylindrical auxiliary yoke is fixed to a cylindrical yoke body by press-fitting the yoke body into the auxiliary yoke or welding them (see, for example, Japanese Patent No. 2793653, page 4, FIG. 3).

However, in each of the aforementioned electro motors, there is a problem that a position of the auxiliary yoke is not stable by it being moving on the yoke body 4 since the auxiliary yoke 5 holds merely the yoke body 4.

Further, the position of the auxiliary yoke is not necessarily stable even though the yoke body is press-fitted in the auxiliary yoke and if the auxiliary yoke is welded to the yoke body, processes of assembling the auxiliary yoke and yoke body are increased because of addition of a welding process.

Under such circumstances, it is considered that an auxiliary yoke 7 is fixed to a yoke body 6, for example, by engagement of an engaged piece 7a provided on the auxiliary yoke 7 into an engaged opening 6a provided in the yoke body 6, as shown in FIGS. 19 and 20.

However, in the structure, there is a possibility that the engaged piece 7a slides under a pressure on the outer peripheral wall of the yoke body 6 until it reaches the engaging opening 6a to thus form a scratch on the peripheral wall of the yoke body.

SUMMARY OF THE INVENTION

The present invention is made in view of the above problems and it is, therefore, an object of the present invention to provide a case and an electric motor and a method for producing the electric motor, capable of assembling easily.

To accomplish the object, a case according to a first aspect of the present invention comprises an outer cylindrical member, an inner cylindrical member fitted in the outer cylindrical member, at least one engaging opening provided in one of the outer and inner cylindrical members, a deformable band provided in the other of the outer and inner cylindrical members for inserting into the engaging opening and a poisoning mechanism provided on the outer and inner cylindrical members to face the deformable band to the engaging opening.

In one embodiment, the positioning mechanism includes a stopper provided on one of the outer and inner cylindrical members to contact with a portion of the other of the outer and inner cylindrical members and a protrusion provided on the other of the outer and inner cylindrical members to contact with the stopper.

An electric motor according to a second aspect of the present invention comprises a yoke in which permanent magnets are held, the yoke including a cylindrical yoke body having a bottom and an auxiliary yoke in which the yoke body is fitted, at least one engaging opening provided in one of the yoke body and auxiliary yoke and a deformable band provided in the other of the yoke body and auxiliary yoke.

The deformable band is fitted in the engaging opening in a state that the yoke body and auxiliary yoke are fitted.

In this case, a positioning mechanism is provided between the yoke body and auxiliary yoke to face the deformable band to the engaging opening.

The deformable band is provided with a plurality of inclined surfaces adapted to contact with edges of the engaging opening to impart a pressed force axially and peripherally of the yoke body or auxiliary yoke.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Some embodiments of the present invention will be explained with reference to the accompanying drawings below.

Figure 1:
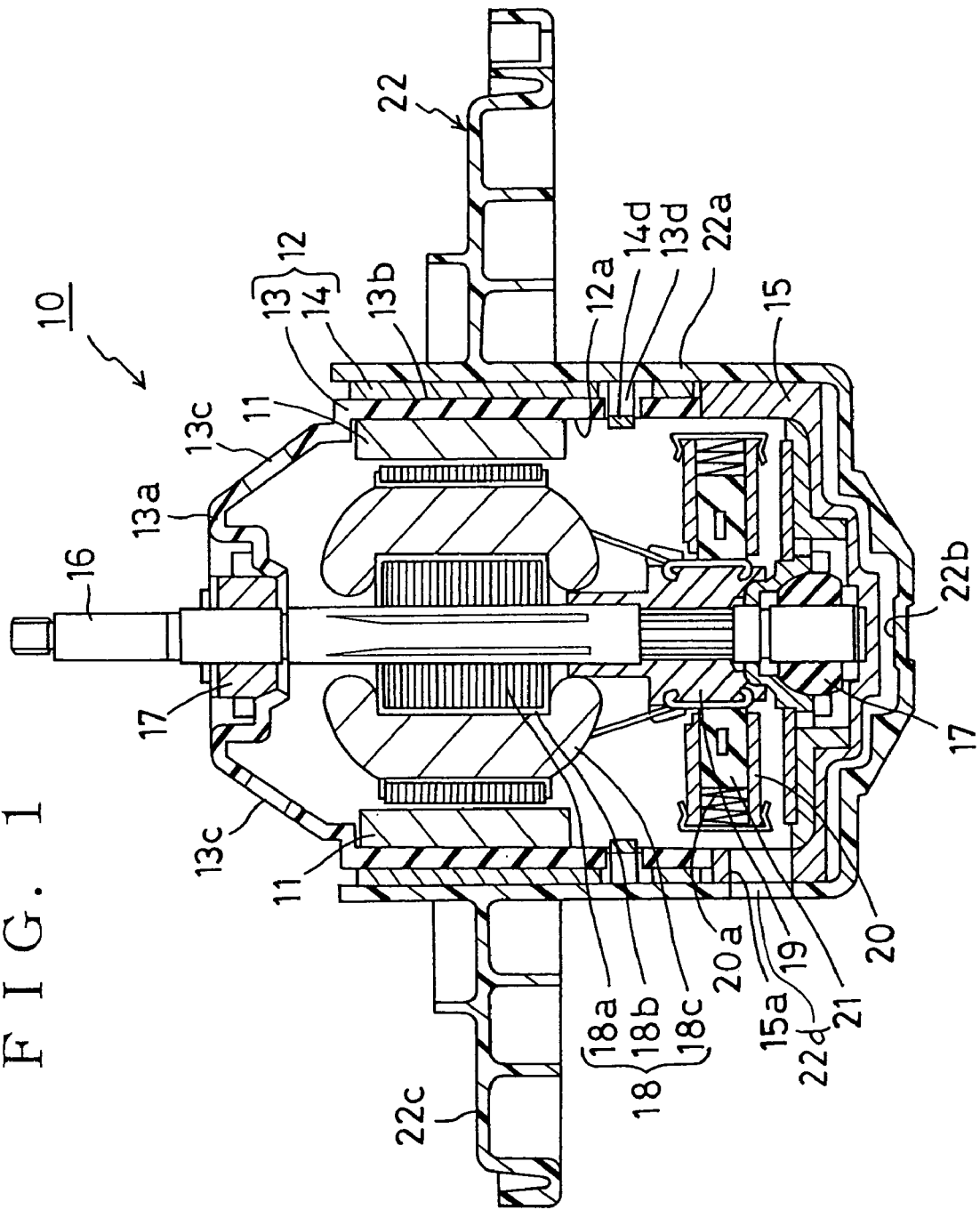
FIG. 1 is a sectional view showing an electric motor according to a first embodiment of the present invention.

A first embodiment of an electric motor 10 according to the present invention will be first described referring to FIGS. 1 to 13. As shown in FIG. 1, the electric motor 10 is mainly composed of a pair of permanent magnets 11 and 11, a cylindrical yoke 12 on an inside wall 12 of which the permanent magnets are held, a bearing housing 15 disposed to cover a lower opening of the yoke 12, a rotational driving shaft 16 passing through a center of the yoke 12, a rotor 18 fixed in a periphery of a middle part of the rotational driving shaft 16 and a mounting bracket 22 to fix the yoke 12 and bearing housing 15 to a mounting object such as a panel.

The permanent magnets 11 and 11 are positioned in an axial middle part substantially of the yoke 12 and held to oppose each other.

The yoke 12 includes a cylindrical yoke body 13 which has at one end (an upper end in FIG. 1) a bottom 13a which is attached integrally to the body and a cylindrical auxiliary yoke 14 fitted in a peripheral wall 13b of the yoke body 13.

Figure 2:
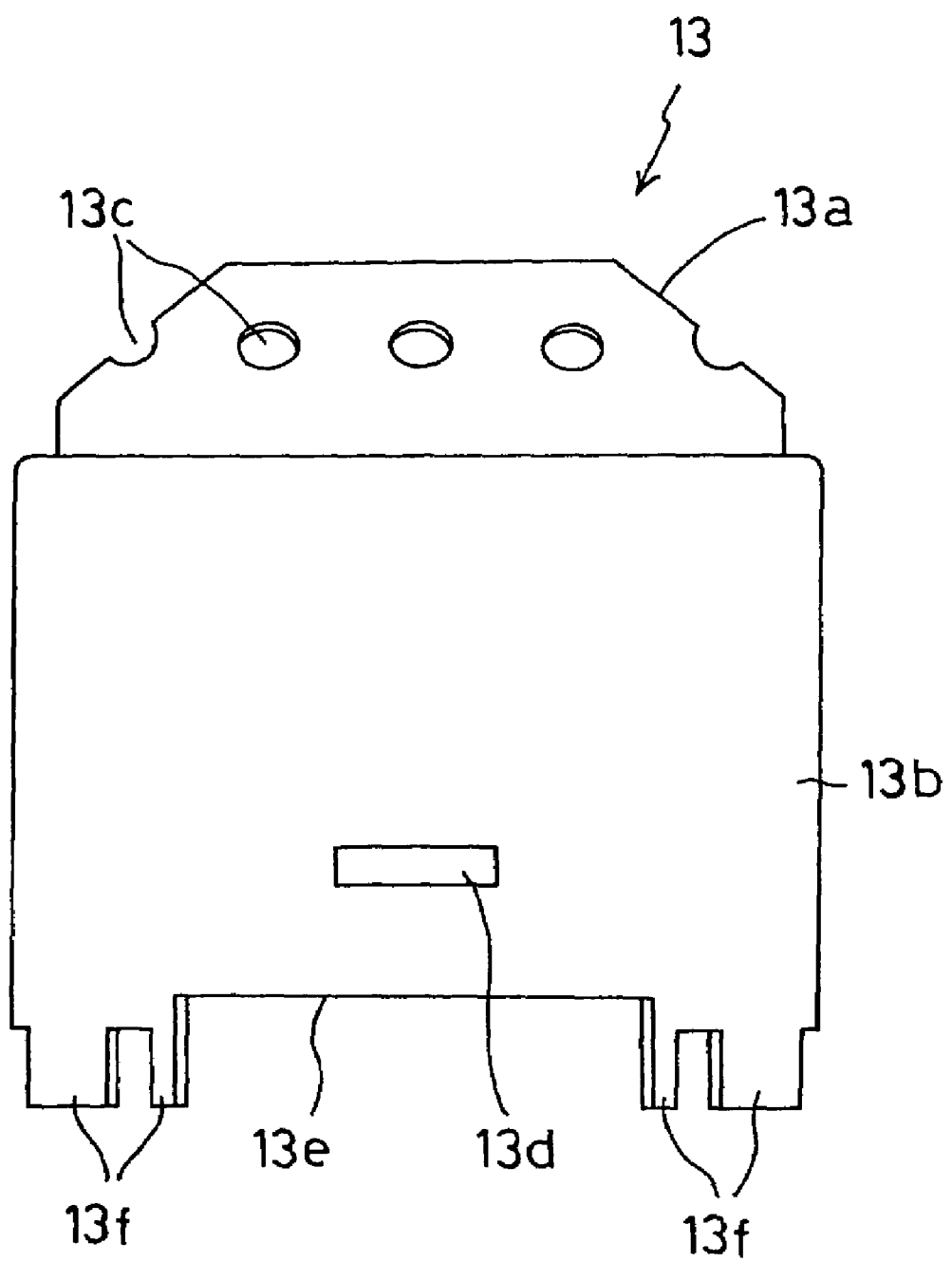
FIG. 2 is a side view of a yoke body in the electric motor.

As shown in FIG. 2, the bottom 13a of the yoke body 13 has a substantially conical shape as viewed from a side surface.

Figure 3:
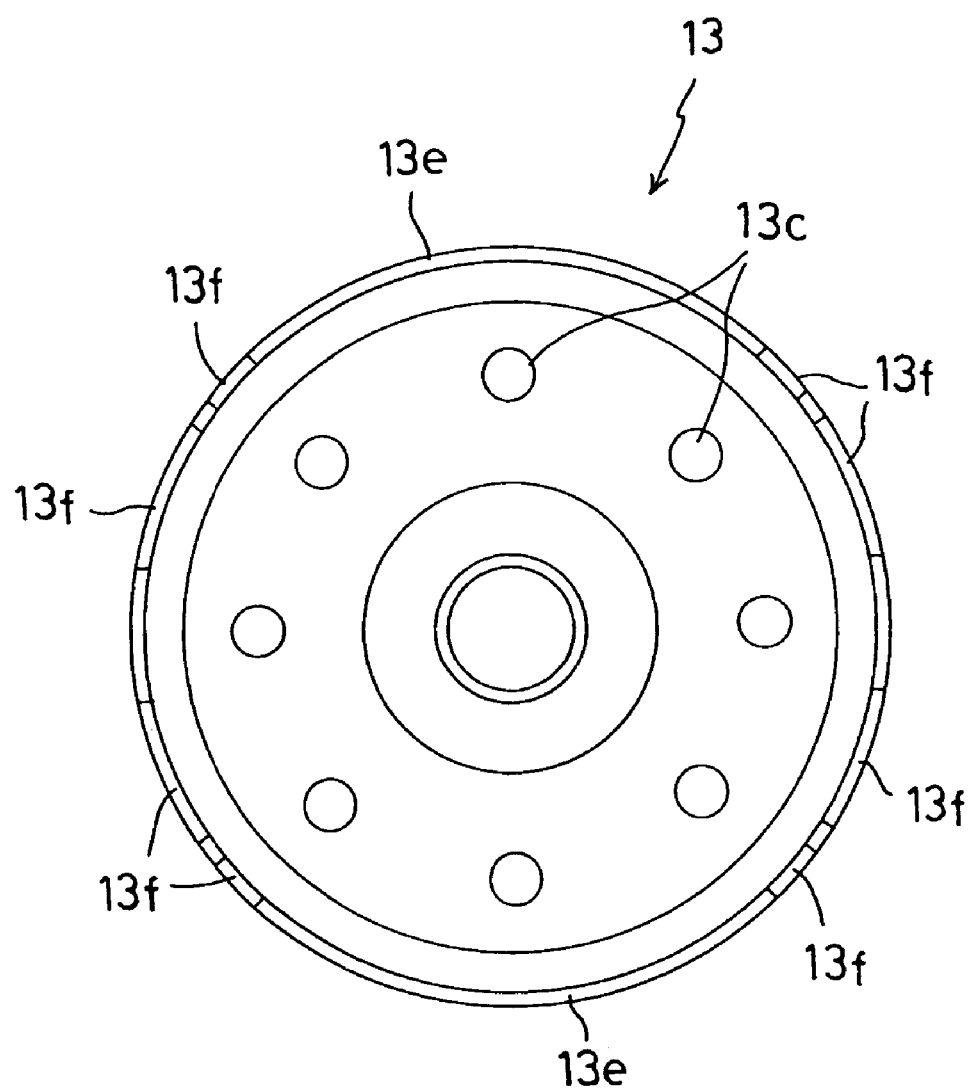
FIG. 3 is a bottom view of the yoke body.

As shown in FIG. 3, a plurality of exhaust holes 13c are arranged with a constant space respectively in the same distance from a center of the bottom 13a to exhaust air for cooling. A portion of the bearing housing 15 is provided with an air suction hole 15a for supplying the air for cooling within the yoke 12. A central part of the bottom 13a is projected downwardly in an inverted hat-like shape, as shown in FIG. 1.

Figure 4:
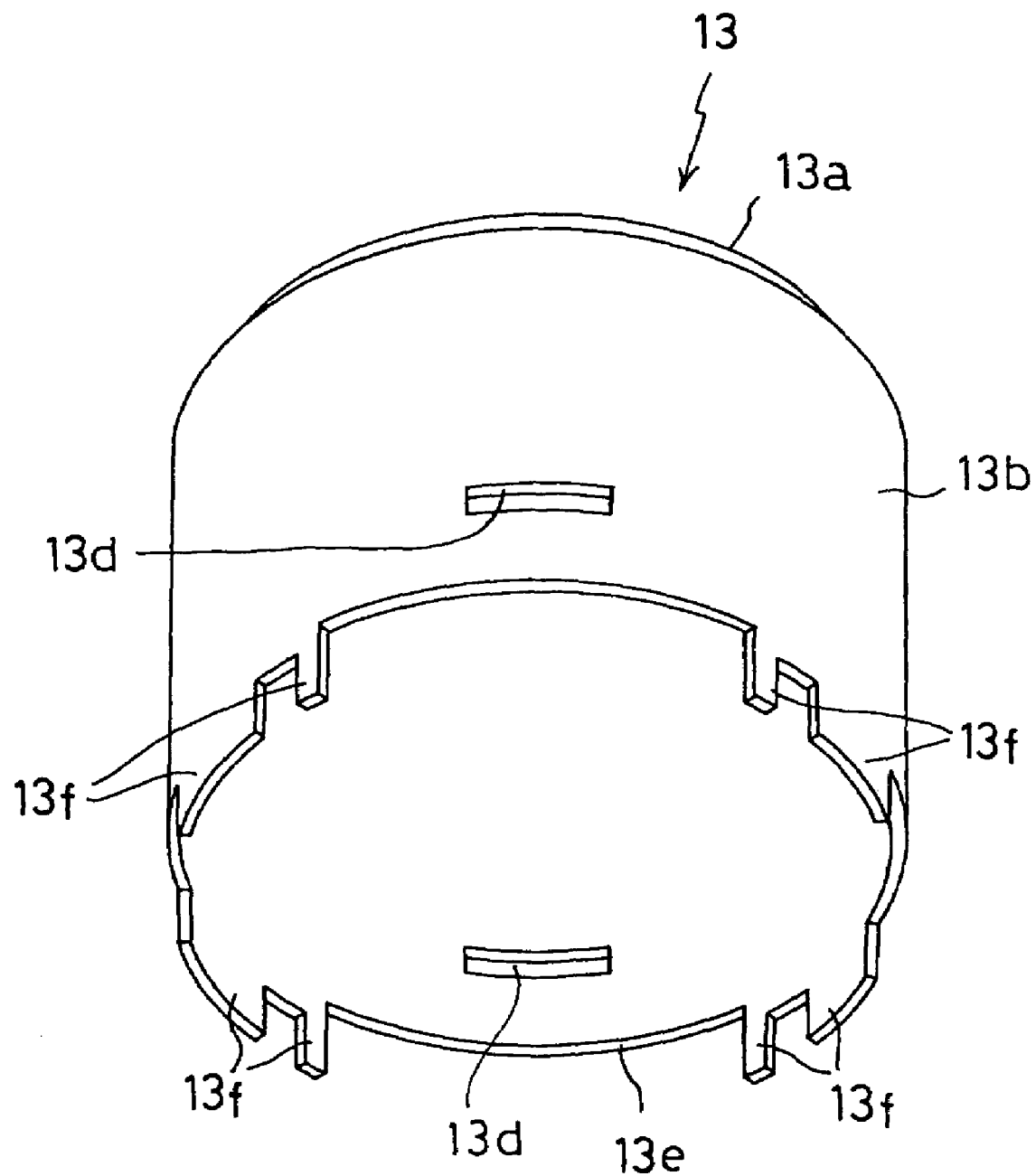
FIG. 4 is a perspective view of the yoke body.

It is noted that at least one engaging opening is provided in one of peripheral walls of the yoke body 13 and auxiliary yoke 14. In this embodiment, two rectangular engaging openings 13d and 13d are formed in the peripheral wall of the yoke body 13, as shown in FIG. 4. The engaging openings 13d and 13d are arranged to oppose each other across a central axis of the yoke body 13.

Figure 5:
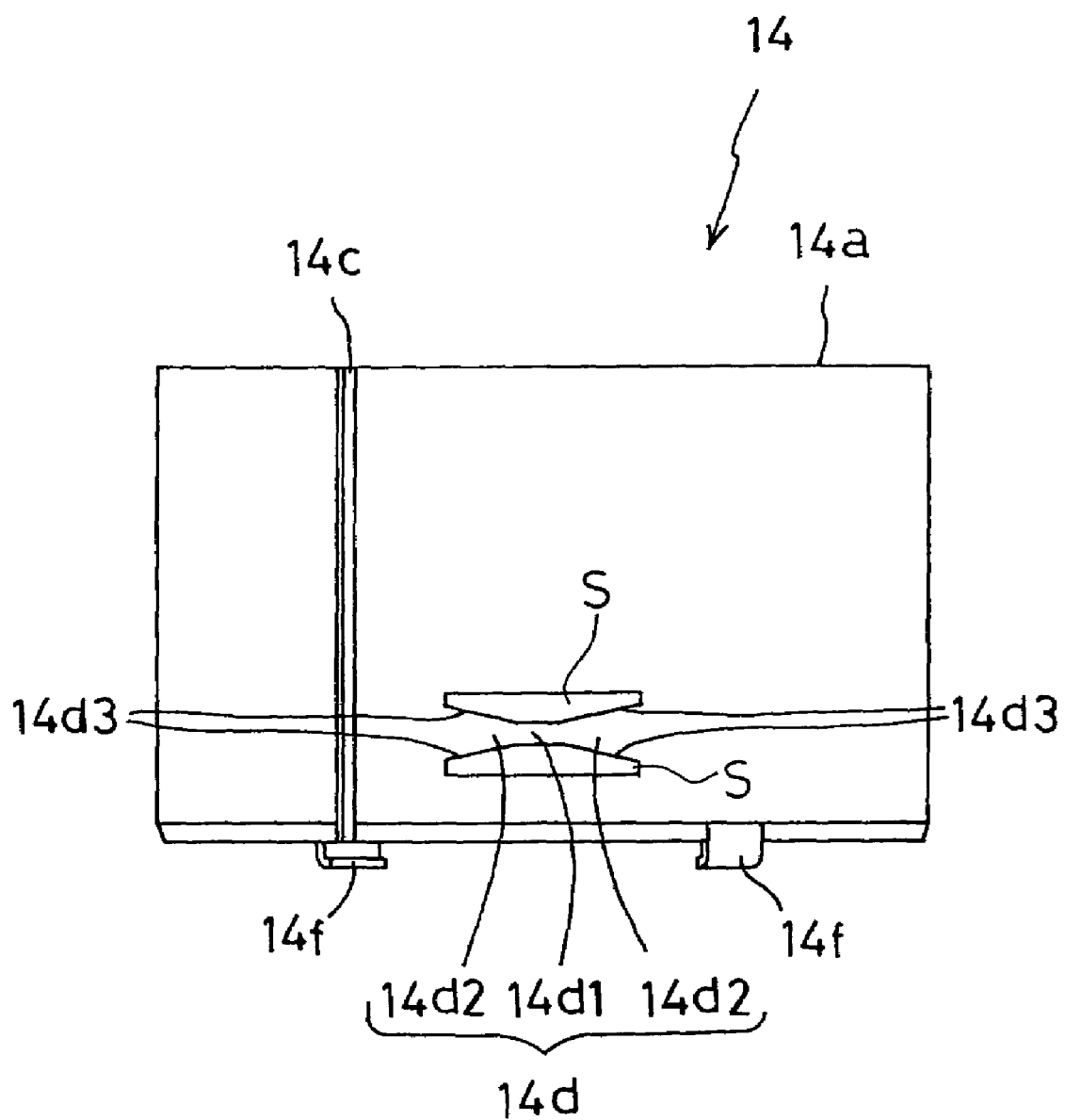
FIG. 5 is a side view of an auxiliary yoke in the electric motor.
Figure 6:
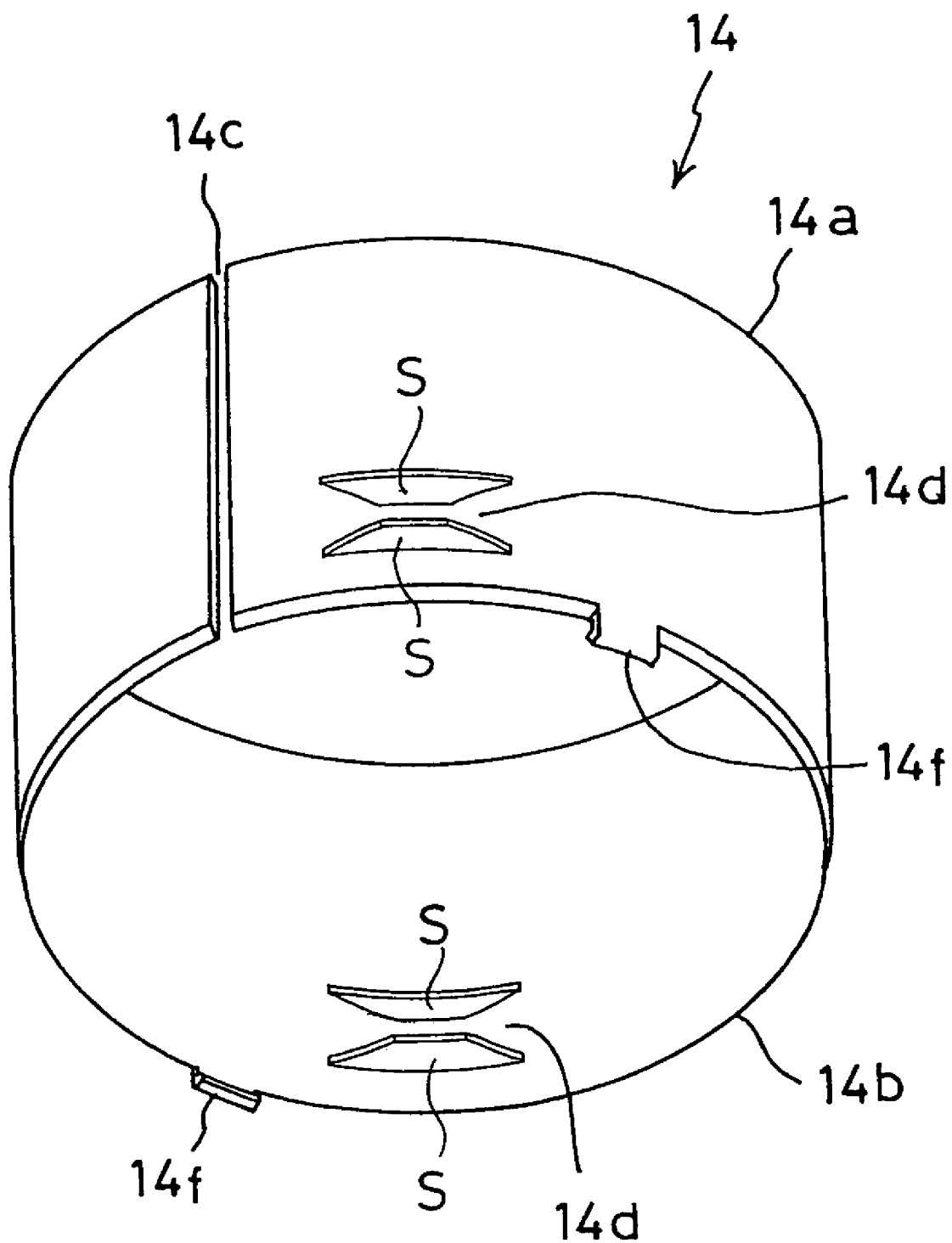
FIG. 6 is a perspective view of the auxiliary yoke.

A lower end 13e of the yoke body 13 is provided with downwardly projecting protrusions 13f which are adapted to be capable of locking the bearing housing 15. As shown in FIGS. 5 and 6, the auxiliary yoke 14 has a slit 14c extending from an upper edge 14a to a lower edge 14b to enlarge peripherally. The auxiliary yoke 14 has an elasticity so that the auxiliary yoke can be enlarged peripherally by the slit 14c while can be reduced in the original shape by the elasticity.

Further, at least one deformable band is provided in the other of the peripheral walls of the yoke body 13 and auxiliary yoke 14 to engage in the least one engaging opening. In this embodiment, two deformable bands 14d are formed on the peripheral wall of the auxiliary yoke 14 to engage in the engaging openings 13d. These deformable bands 14d are arranged to oppose each other across a central axis of the auxiliary yoke 14. Each of the deformable bands 14d is formed between a pair of adjacent trapezoidal cutouts S and S and has a elongated rectangular central bridged portion 14d1 and a pair of trapezoidal portions 14d2 and 14d2 which are arranged in right and left sides of the central bridged portion as viewed from FIG., 7.

The central bridged portion 14d1 in each deformable band 14d has an elasticity and is deformable to insert in and remove from the corresponding engaging opening 13d.

A width H1 of each of the central bridged portions 14d1 is less than a width H2 of the engaging opening 13d.

Further, the maximum width H3 of each deformable band 14d is large than the width H2 of the corresponding engaging opening 13d.

Inclined surfaces 14d3 are provided on the both sides of the central bridged portion 14d1 to form the trapezoidal portions 14d2. The opposed inclined surfaces on each side of the central bridged portion are set to widen a space between the opposed inclined surfaces according to go away from the central bridged portion. In other words, each deformable band 14d is provided with a set of inclined surfaces 14d3 which is arranged on each side of the central bridged portion 14d1.

Consequently, when the central bridged portion 14d1 of each deformable band is inserted into the corresponding engaging opening 13d, the engagement of the central bridged portion and engaging opening is held and the four inclined surfaces 14d3 are adapted to impart a pressed force to edges of the engaging opening 13d by means of the elasticity occurred by the slit 14c of the auxiliary yoke 14.

Figure 9:
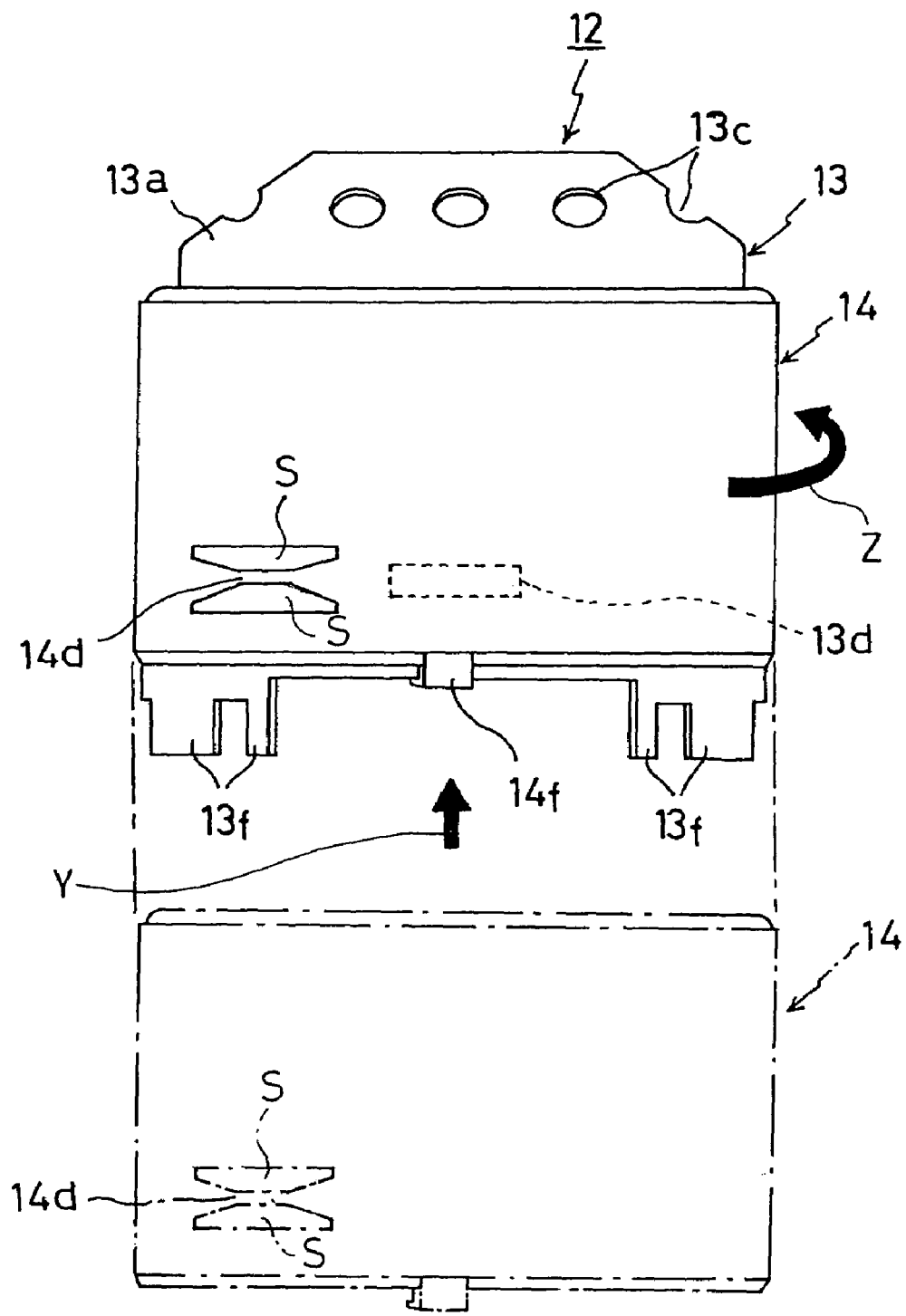
FIG. 9 is an explanatory view showing a process of assembling the electric motor.

Further, a lower edge 14b of the auxiliary yoke 14 is provided with stoppers 14f and 14f arranged to oppose each other across the central axis of the auxiliary yoke, as shown in FIG. 9. Each of the stoppers 14f has a L-letter shape which a vertical portion extending downwardly from the a lower end of the auxiliary yoke 14 and a horizontal portion extending from a lower end of the vertical portion to the central axis of the auxiliary yoke. When the auxiliary yoke 14 is moved on the peripheral wall 13b of the yoke body 13 in an upper direction as shown by arrow Y in FIG. 9, the stoppers stop the movement of the auxiliary yoke 14 by abutment of the stoppers with the lower end 13e of the yoke body 13. When the auxiliary yoke 14 is rotated relative to the yoke body 13 in a direction as shown by arrow Z in FIG. 9, it is rotated by sliding between the stoppers 14f and the lower end of the 13e of the yoke body 13 and then the stoppers are abutted with the protrusions 13f to stop the rotation of the auxiliary yoke 14.

When the stoppers 14f are abutted with the protrusions 13f of the yoke body 13, the deformable bands 14d are disposed to face to the engaging openings 13.

In this way, the electric motor 10 is configured in such a manner that the auxiliary yoke 14 is fitted on the yoke body 13 in such a manner that the central bridged portions 14d1 are inserted into the engaging openings 13d, respectively and inclined surfaces 14d3 press the edges of the engaging openings 13d (see FIG. 1)

The bearing housing 15 is engaged with the protrusions 13f of the yoke body 13.

The rotational driving shaft 16 is rotatably supported by bearings 17 and 17 provided in central parts of the bottom 13a of the yoke body 13 and bearing housing 15.

The rotor 18 is fixed on an intermediate part of the rotational driving shaft 16. The rotor 18 is composed of a core 18a made of laminated steel plates, a plurality of slots 18b provided peripherally of an outer peripheral wall of the core 18a and coils 18c wound around the slots.

Further, a commutator 19 is attached on the rotational driving shaft 16 between the rotor 18 and bearing housing 15 to pass an electrical power to the coils 18c. Disposed to face the commutator 19 are two blush holders 20 which are made of an insulting material such as plastic resin. The blush holders are connected with a blush substrate (not shown). A brush 21 is disposed within each of the brush holders 20 to be movable radially of a yoke 12. The brush 21 is electrically connected with a coupler terminal (not shown) provided on an outer peripheral wall of each yoke 12.

Each brush 21 is biased toward the commutator 19 by a spring 20a supported in each of the brush holders 20 to contact resiliently an inner end of the brush 21 with an outer peripheral wall of the commutator 19.

The mounting bracket 22 has a cylindrical bracket body 22a in which the yoke 12 is fitted, a bottom 22b and a flange 22c extending radially from the bracket body 22a. The electric motor 10 can be fixed to the mounting object by fixing the flange 22c to the mounting object.

In addition, the bracket body 22a is provided with a hole 22d for communicating with the air suction hole 15a of the bearing housing 15.

Subsequently, an assembled method of the electric motor as described above will be explained below.

The permanent magnets 11 and 11 are first held on the inner peripheral wall of the yoke body 13 and then the auxiliary yoke 14 is fitted on the outer peripheral wall of the yoke body 13 by matching the upper edge 14a of the auxiliary yoke with the lower end 13e of the yoke body 13 and sliding upwardly the auxiliary yoke 14 along the outer peripheral wall of the yoke body 13 as shown in FIG. 9. The upper movement of the auxiliary yoke 14 is stopped by the abutment of the stoppers 14f of the auxiliary yoke 14 with the lower end 13e of the yoke body 13.

Figure 10:
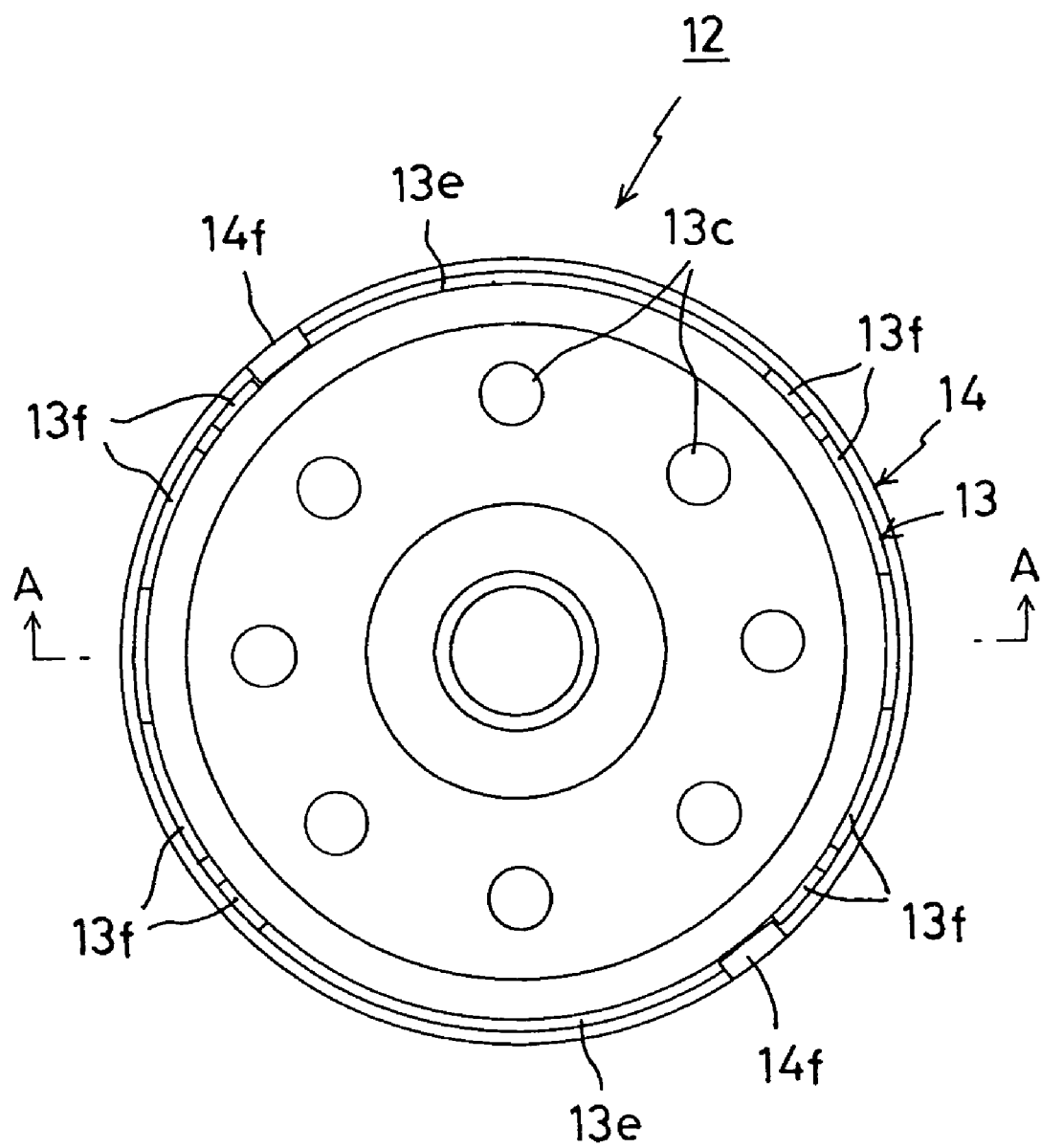
FIG. 10 is a bottom view of a yoke in the electric motor.
Figure 11:
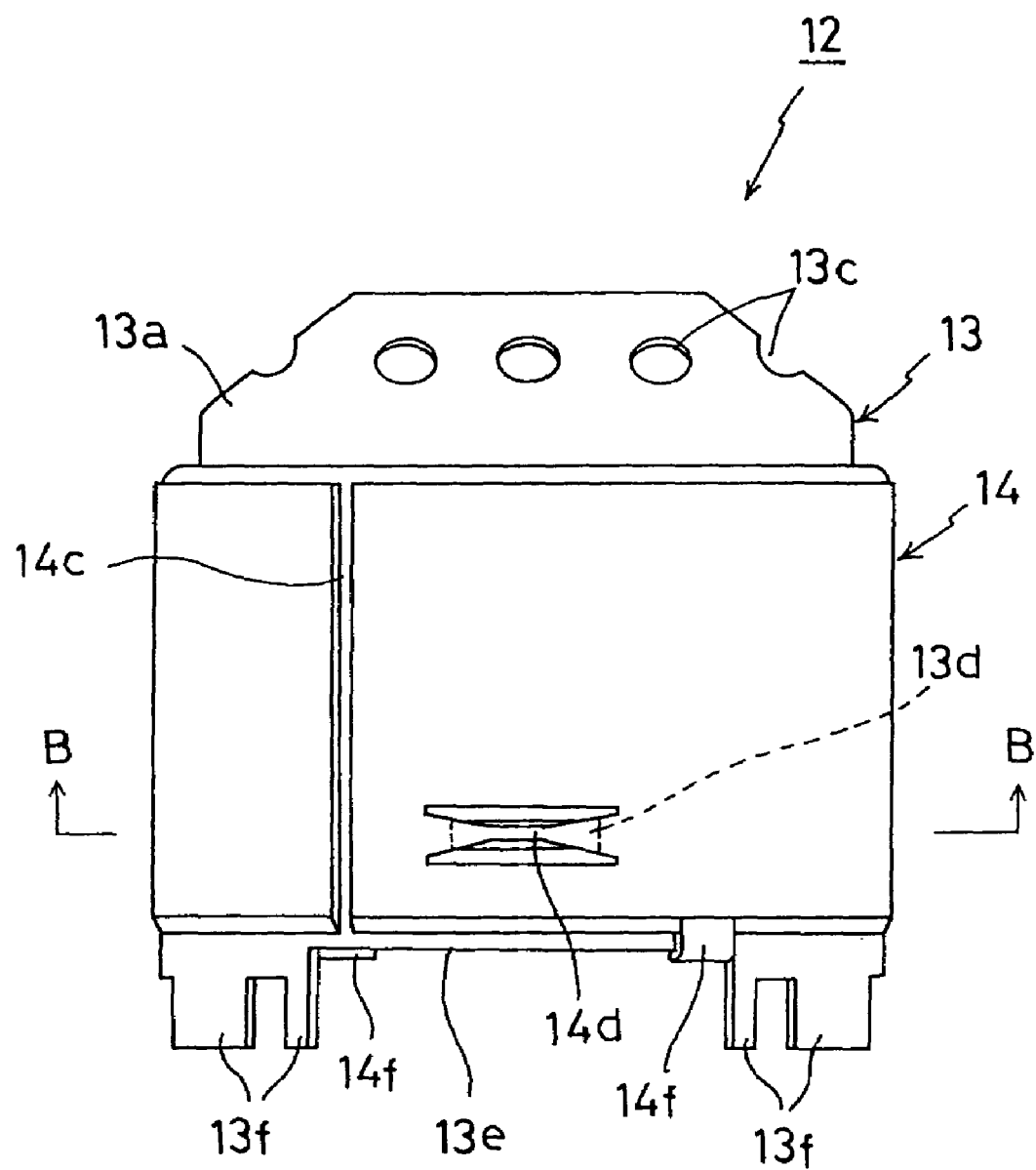
FIG. 11 is a side view of the yoke.
Figure 12:
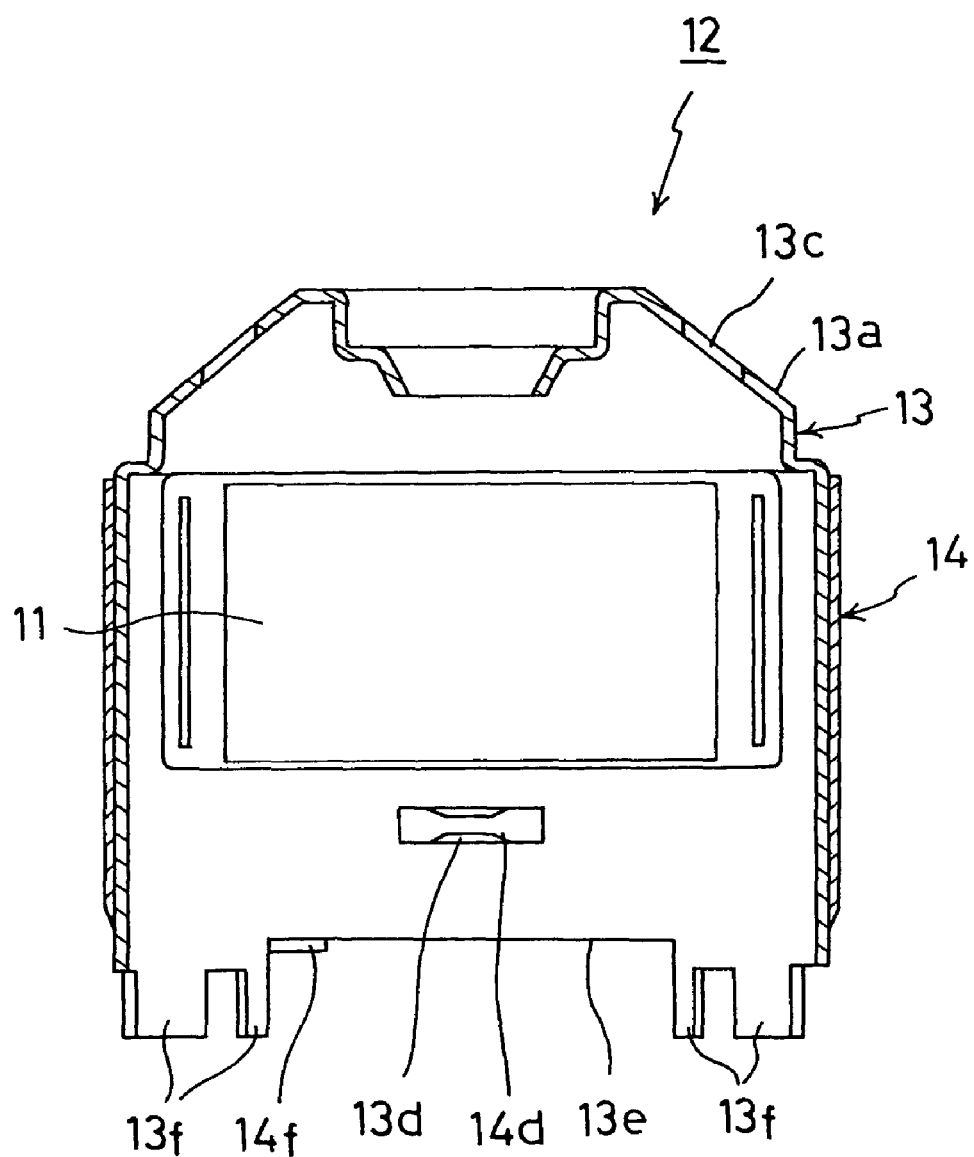
FIG. 12 is a sectional view of the yoke taken along the line A—A in FIG. 10.
Figure 13:
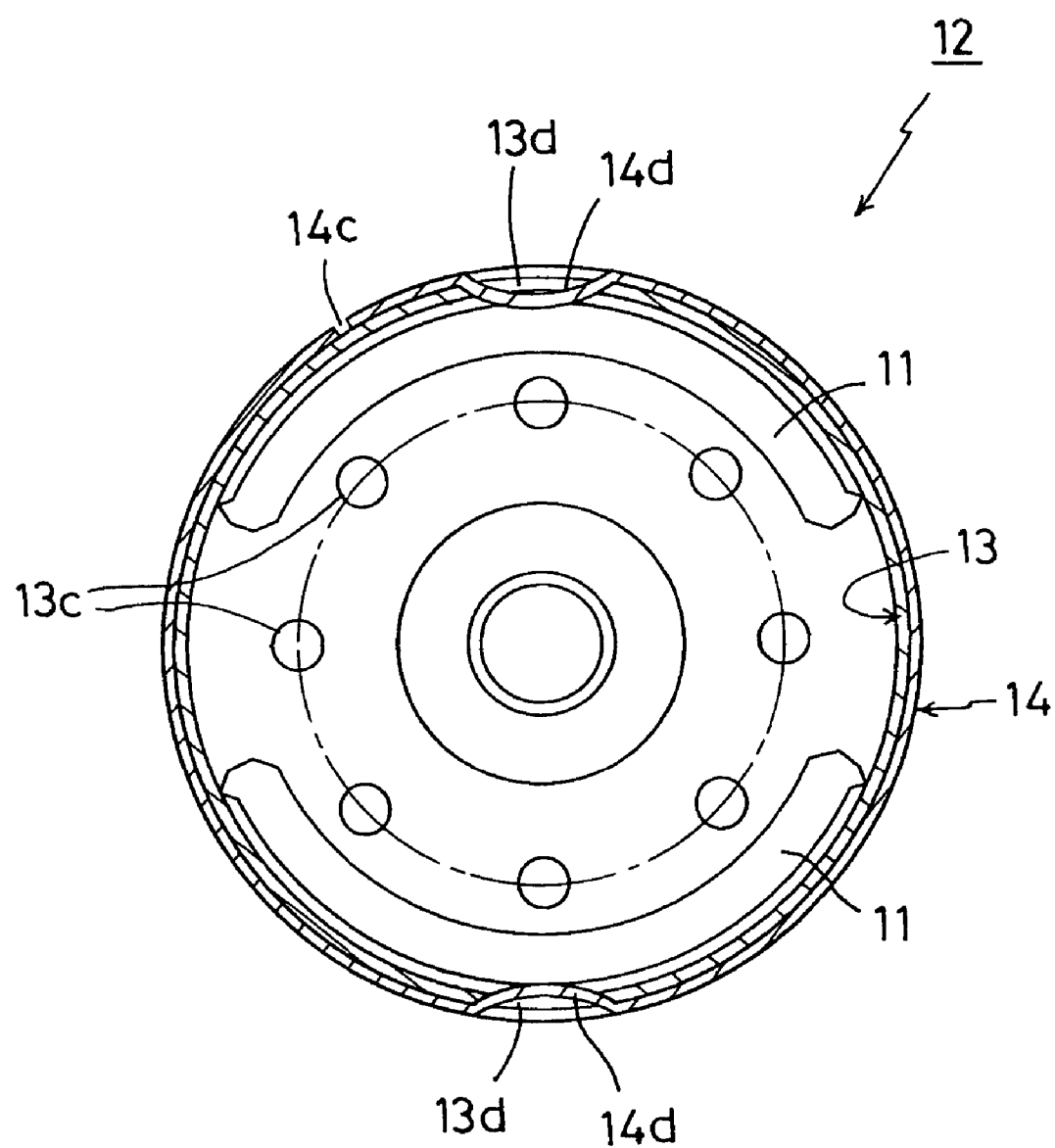
FIG. 13 is a sectional view of the yoke taken along the line B—B in FIG. 11.
Figure 14:
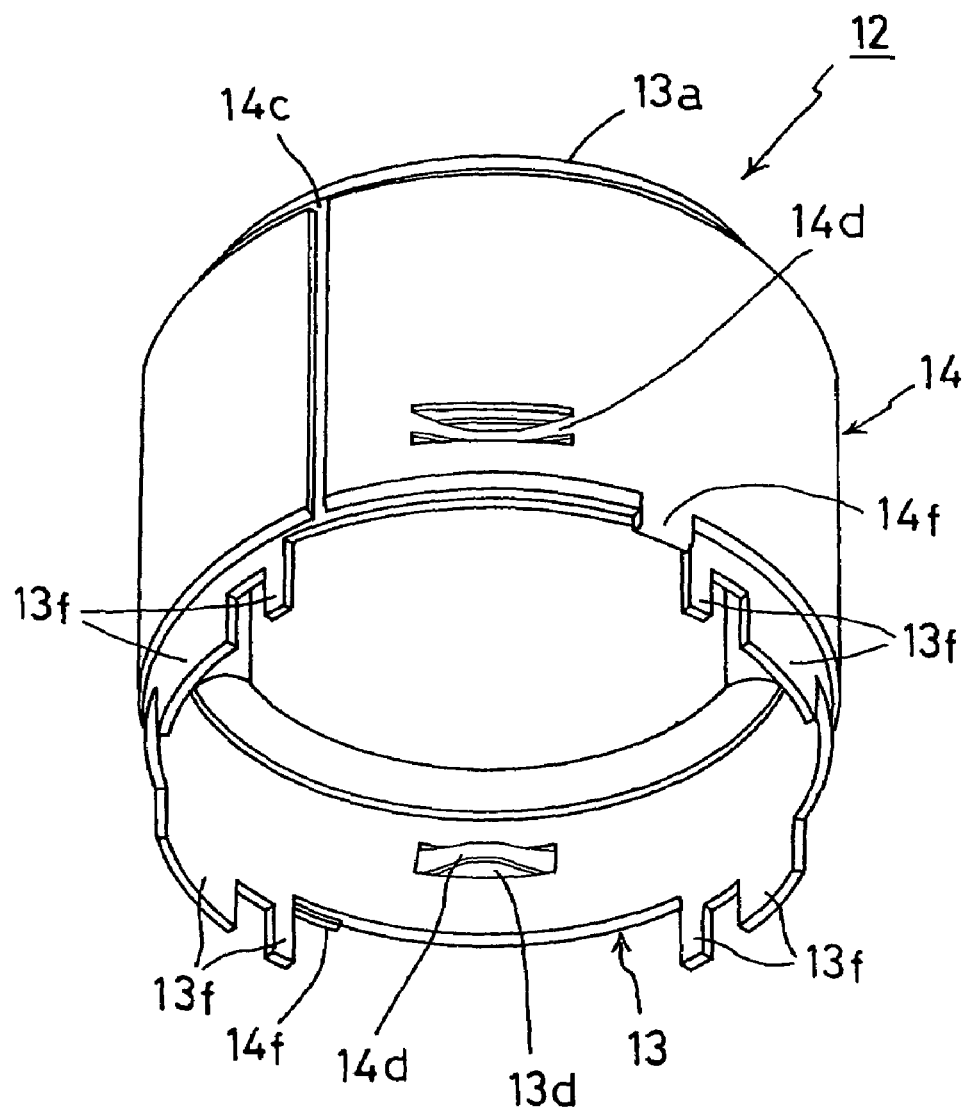
FIG. 14 is a perspective view of the yoke.

The auxiliary yoke 14 is then rotated relative to the yoke body 13 in the direction as shown by the arrow Z in FIG. 9. During the rotation of the auxiliary yoke 14, the stoppers 14f are abutted with the protrusions 13f of the yoke body 13 as shown in FIGS. 10 and 12 to stop the rotation of the auxiliary yoke 14 relative to the yoke body 13. At this time, the deformable bands 14d of the auxiliary yoke 14 are arranged to face the engaging openings 13d of the yoke body 13 and at least the central bridged portion 14d1 of each of the deformable bands 14 is inserted or snapped into the corresponding engaging openings 13d to prevent the auxiliary yoke 14 from rotating and moving axially relative to the yoke body 13.

In this case, since the auxiliary yoke has an elasticity and the slit 14c, even though the deformable bands are projected inwardly of the auxiliary yoke, a scratch or the like does not occur on the yoke body.

Alternatively, when the deformable bands are faced the engaging openings, when a worker presses the deformable bands to insert them into the engaging openings, the deformable bands, especially the central bridged portions are deformed to insert into the engaging openings. At this time, the inclined surfaces are also pressed against the edges of the engaging openings. As a result, the auxiliary yoke 14 is locked certainly on the yoke body 13. In this embodiment, it is not necessary that the auxiliary yoke 14 has the aforementioned structure for enlarging peripherally. In addition, since the deformable bands are not projected inwardly of the auxiliary yoke at an initial step, even though the auxiliary yoke is rotated on the yoke body, a scratch or the like does not occur on the yoke body.

In the aforementioned first embodiment, because the electric motor 10 has the four inclined surfaces 14d3, these four inclined surfaces in each deformable band 14d are pressed on the edges of each of the engaging openings 13d.

Figure 7:
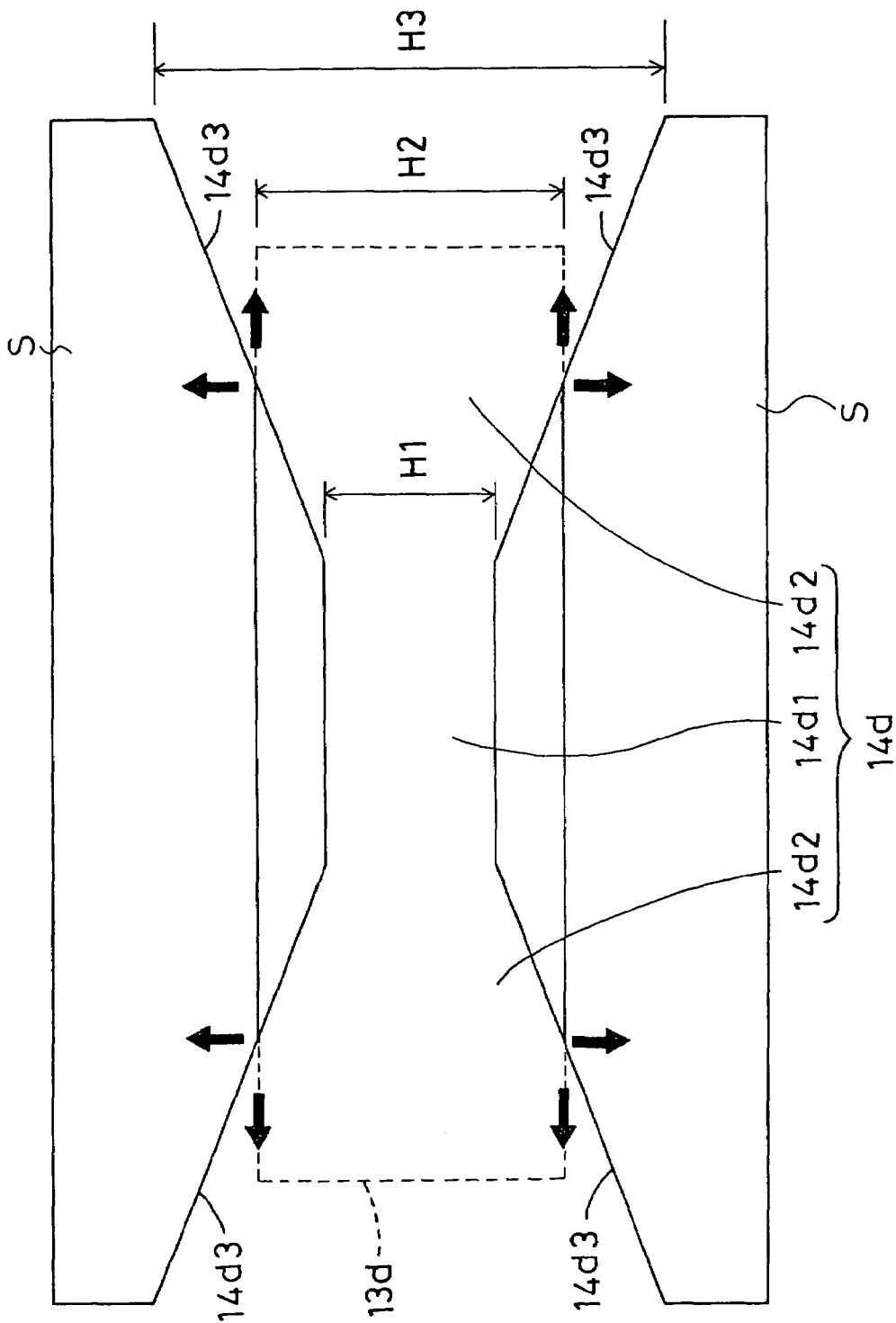
FIG. 7 is an operational view showing a state that deformable bands according to the present invention impart a pressed force to edges of an engaging opening.
Figure 8:
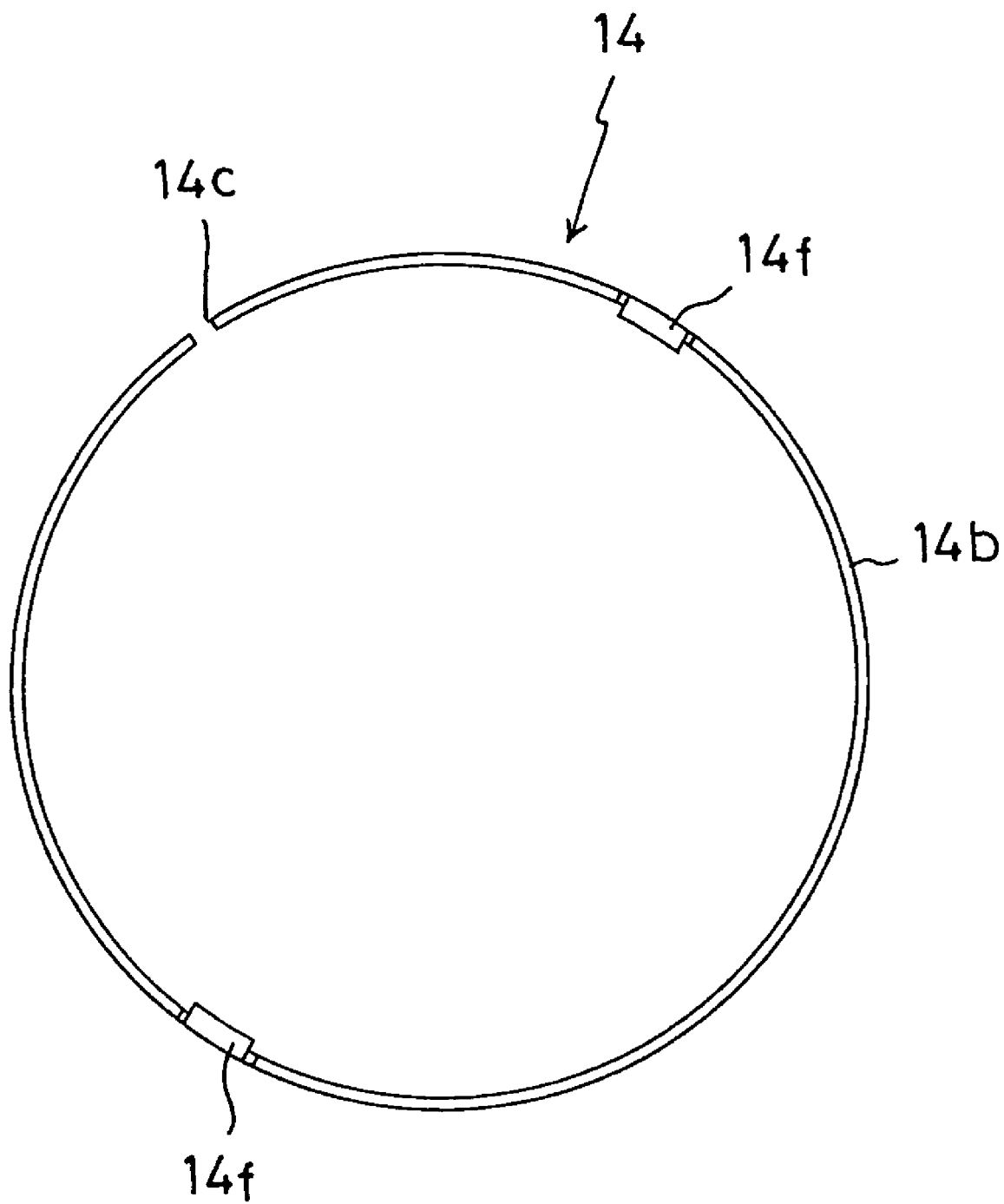
FIG. 8 is a bottom view of the auxiliary yoke.

More specifically, as shown in FIG. 7, the upper two inclined surfaces 14d3 in each deformable opening 14d are pressed upward and rightward and leftward as shown by the arrows in FIG. 7 on the upper edge of the engaging opening 13d, and the lower two inclined surfaces 14d3 are pressed downward and rightward and leftward as shown by the arrows in FIG. 7 on the lower edge of the engaging opening 13d.

In this way, because the four inclined surfaces 14d3 in each deformable band 14 are adapted to impart a pressed force on the edges of the engaging opening 13d in axial and peripheral directions of the yoke body 13, the auxiliary yoke 14 is locked certainly on the yoke body 13 without being moved relative to the yoke body. This is accomplished by only inserting each of the deformable bands 14d provided in the auxiliary yoke 14 into each of the engaging openings 13d provided in the yoke body 13 by rotating relatively the auxiliary yoke and yoke body.

In addition, when the auxiliary yoke 14 is locked on the yoke body 13, and the electric motor 10 is attached through the mounting bracket 22 to the mounting object, even during driving of the electric motor, the yoke body 13 is not moved within the auxiliary yoke 14 to maintain a stability of the assembled electric motor.

In the aforementioned electric motor, when the stoppers 14f are contacted with the protrusions 13f, the deformable bands 14d are faced to the engaging openings 13d and therefore it is very easy to fit the deformable bands in the engaging openings.

Figure 15:
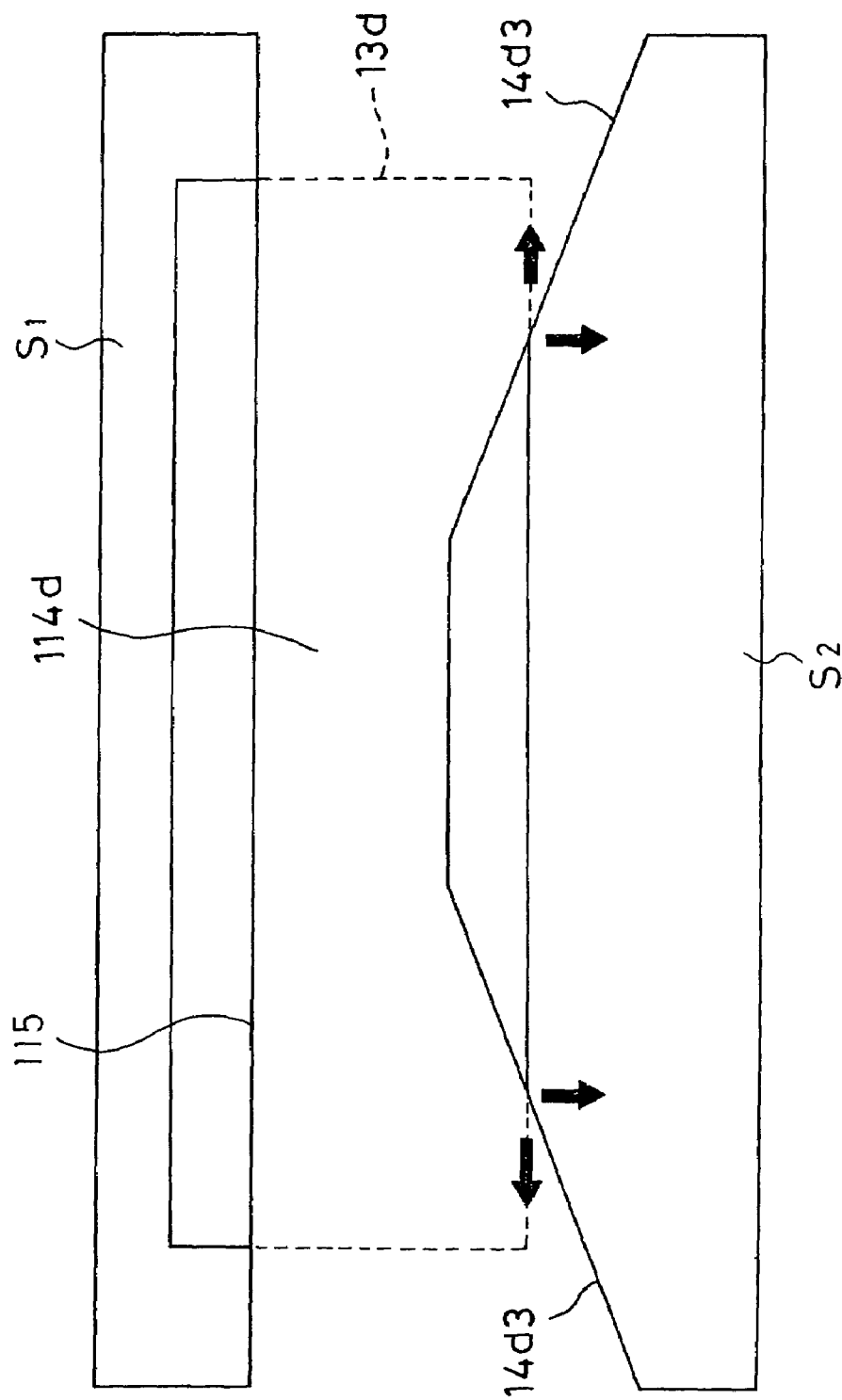
FIG. 15 is a side view of a yoke in a second embodiment.

Referring to FIG. 15, a second embodiment of the present invention is shown. In the second embodiment, the similar numerals are attached to the similar parts as in the first embodiment.

In the embodiment, a configuration of each of deformable bands 114d is shown in FIG. 15. In the configuration, the deformable band 114d is formed between an upper elongate rectangular cutout S1 and a lower trapezoidal cutout S2 as shown in FIG. 15. As a result of the cutouts, the deformable band 114d has a lower part having the inclined surfaces 14d3 and 14d3 similar to that in the first embodiment, which are symmetrical in right and left, as viewed from FIG. 15, and an upper part formed from a straight surface 115.

An arrangement and so on of the deformable bands 114d are the same as that in the deformable bands 14d in the first embodiment.

When the deformable bands 114d are inserted into the engaging openings 13d, the auxiliary yoke 14 is no moved relative to the yoke body 13. Further, the edges of the engaging openings 13d are pressed downward and rightward and leftward as shown by arrows in FIG. 15 by means of the inclined surfaces 14d to prevent the auxiliary yoke 14 from moving peripherally thereby locking further certainly the axial and peripheral movements of the auxiliary yoke 14 relative to the yoke body 13.

More specifically, when the inclined surfaces 14d impart downwardly a pressed force to the edges of the engaging openings, there is a possibility that an energized force is imparted to the auxiliary yoke 14, which tends to move upwardly (as viewed in FIG. 15) the yoke body 13.

However, at this time, the stoppers 14f of the auxiliary yoke 14 are abutted with the lower end of the yoke body 13 and therefore the auxiliary yoke 14 does not move upwardly relative to the yoke body.

In the electric motor in the embodiment, the auxiliary yoke 14 is locked certainly to the yoke body 13 only by inserting the deformable bands 114d of the auxiliary yoke 14 into the engaging openings 13d of the yoke body 13.

Figure 16:
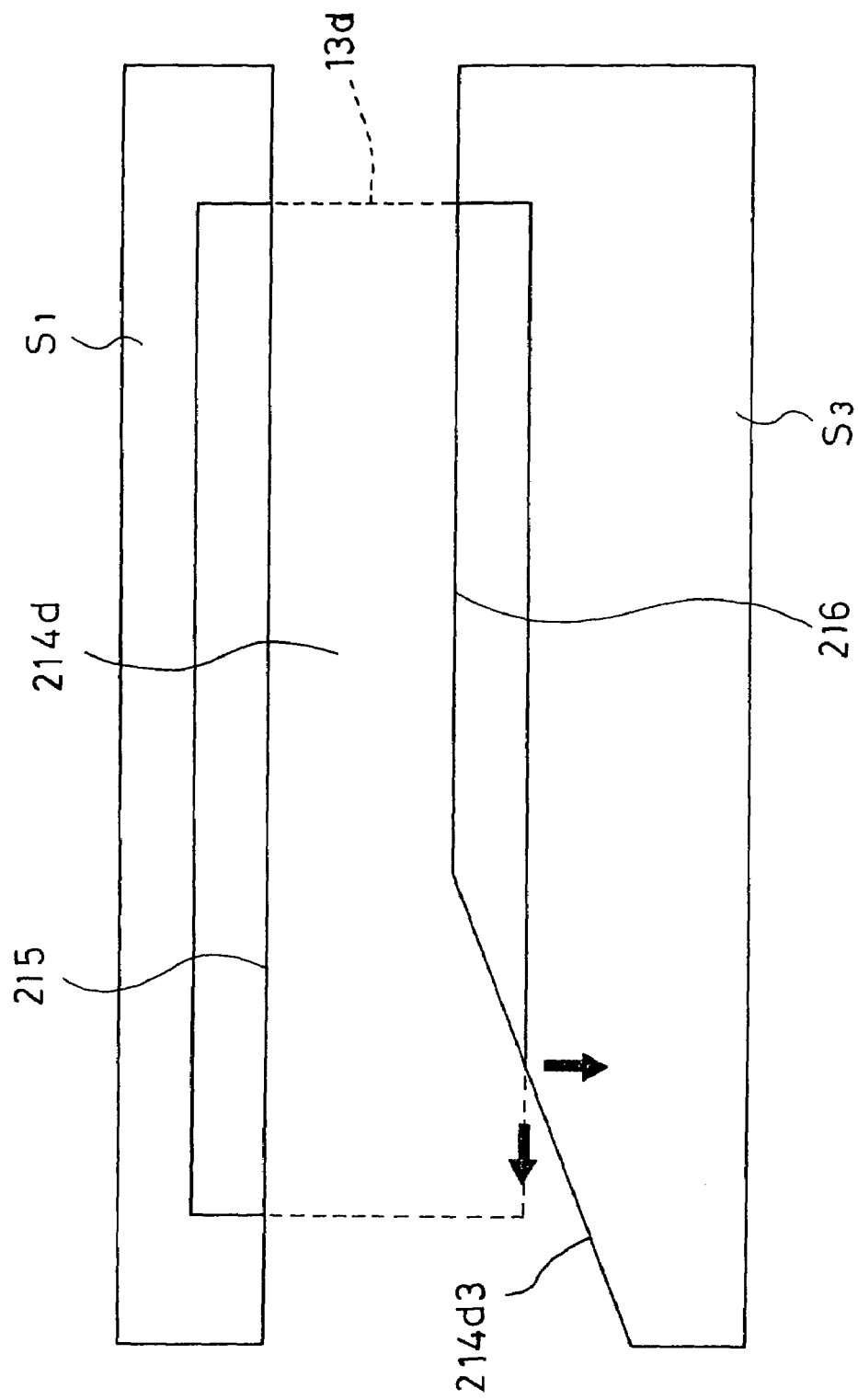
FIG. 16 is a side view of a yoke in a third embodiment.
Figure 17:
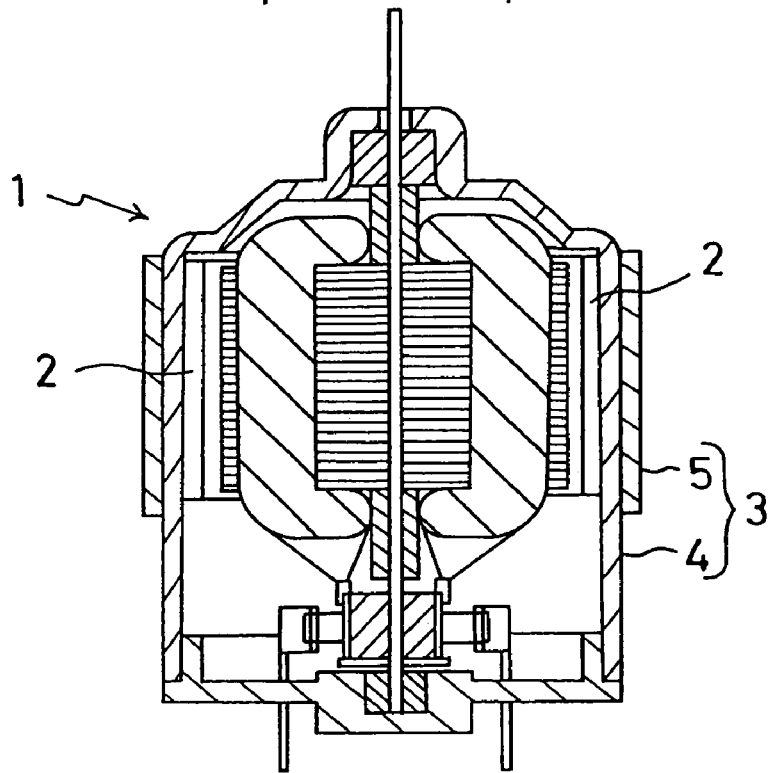
FIG. 17 is a sectional view of a first conventional electric motor.
Figure 18:
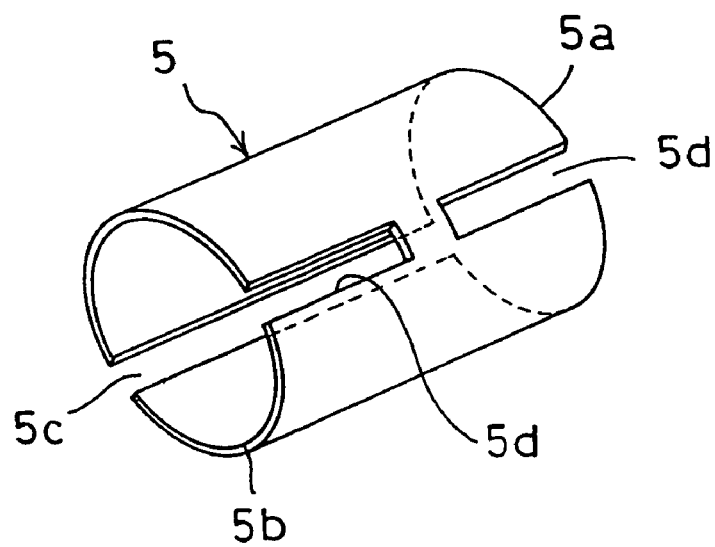
FIG. 18 is a perspective view of an auxiliary yoke in the first conventional electric motor.
Figure 19:
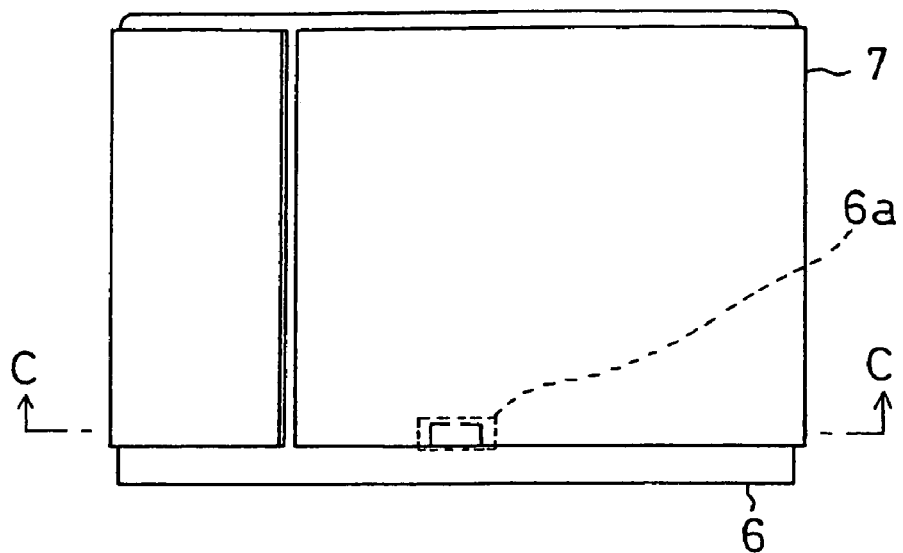
FIG. 19 is a side view of a second conventional electric motor.
Figure 20:
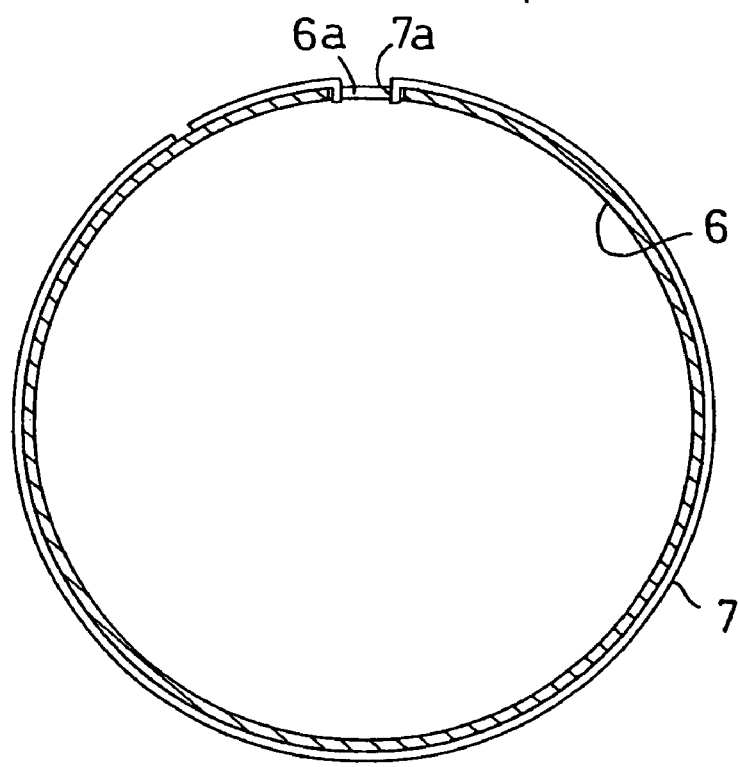
FIG. 20 is a sectional view taken along the line C—C in FIG. 19.

Referring to FIG. 16, a third embodiment of the present invention is shown.

In FIG. 16, the similar numerals are attached to the similar parts as in the first and second embodiments.

In the embodiment, the electric motor 10 has deformable bands 214d each of which is formed between the same upper elongate rectangular cutout S1 as in the second embodiment and a lower cutout S3, as shown in FIG. 16. The lower cutout S3 has a right straight surface and a left inclined surface as viewed in FIG. 16. As a result of the cutouts, each deformable band 214d has a lower part having an inclined surface 214d3 and a straight surface 216 and an upper part formed from a straight surface 215.

An arrangement and the other structure of the deformable bands 214d are the same as that in the deformable bands 14d and 114d in the first and second embodiments.

When the deformable bands 214d are inserted into the engaging openings 13d, the auxiliary yoke 14 is no moved relative to the yoke body 13. Further, the edges of the engaging openings 13d are pressed downward and leftward as shown by arrows in FIG. 16 by means of the inclined surfaces 214d3 to prevent the auxiliary yoke 14 from moving peripherally thereby locking further certainly the axial and peripheral movements of the auxiliary yoke 14 relative to the yoke body 13.

The other operation of the deformable bands 214d is the same as in the second embodiment.

In the electric motor in the embodiment, the auxiliary yoke 14 is locked certainly to the yoke body 13 only by inserting the deformable bands 214d of the auxiliary yoke 14 into the engaging openings 13d of the yoke body 13.

As described above, according to the present invention, it is possible to prevent the auxiliary yoke from removing relative to the yoke body by means of a easy operation.

Although the various embodiments have been explained, the present invention is not limited to these embodiments. For example, in the aforementioned embodiments, two sets of the deformable bands and engaging openings have been provided on the yoke, but, one set or three sets of the deformable bands and engaging openings may be provided on the yoke.

A shape and a size of the deformable bands and engaging openings are also not limited to that in the above embodiments.

What is claimed is:

1. A case comprising:
    an outer cylindrical member;
    an inner cylindrical member fitted in said outer cylindrical member;
    at least one engaging opening provided in one of said inner and outer cylindrical members;
    a deformable band provided in the other of said inner and outer cylindrical members for inserting into said engaging opening; and
    a positioning mechanism provided between said inner and outer cylindrical members to face said deformable band to said engaging opening,
    wherein said positioning mechanism has a stopper provided on one of said inner and outer cylindrical members, to contact with the other of the inner and outer cylindrical members, and a protrusion provided on the other of said inner and outer cylindrical members to contact with said stopper.

2. The case according to claim 1, wherein said deformable band includes a plurality of inclined surfaces which are contacted with edges of said engaging opening to impart a pressed force axially and peripherally of the inner or outer cylindrical member.

3. The case according to claim 1, wherein said deformable band includes inclined surfaces which are contacted with the edges of the engaging opening to impart a pressed force thereto so as to contact the stopper with the other of the inner and outer cylindrical members.

4. An electric motor comprising:
    a yoke in which permanent magnets are held,
    said yoke including a cylindrical yoke body having a bottom and an auxiliary yoke in which said yoke body is fitted;
    at least one engaging opening provided in one of said yoke body and auxiliary yoke;
    a deformable band provided in the other of said yoke body and auxiliary yoke, wherein said deformable band is fitted in said engaging opening in a state that said yoke body and auxiliary yoke are fitted; and
    a positioning mechanism provided between said yoke body and auxiliary yoke to face said deformable band to the engaging opening,
    wherein said positioning mechanism includes a stopper provided on said auxiliary yoke, to contact with a portion of said yoke body, and a protrusion provided on said yoke body to contact with said stopper.

5. The electric motor according to claim 4, wherein said deformable band includes a plurality of inclined surfaces which are contacted with edges of said engaging opening to impart a pressed force thereto axially and peripherally of the yoke body or auxiliary yoke.

6. The electric motor according to claim 4, wherein said deformable band includes inclined surfaces which are contacted with the edges of the engaging opening to impart thereto a pressed force so as to contact the stopper with the yoke body.

7. A method for producing an electric motor, comprising the steps of:
    fitting a cylindrical yoke body into a cylindrical auxiliary yoke;
    rotating said auxiliary yoke relative to said yoke body;
    facing a deformable band provided on one of said auxiliary yoke and yoke body to an engaging opening provided on the other of said auxiliary yoke and yoke body by abutting a stopper provided on one of said auxiliary yoke and yoke body with a protrusion provided on the other of the auxiliary yoke and yoke body; and
    inserting said deformable band into said engaging opening.

* * * * *